United States Patent
Pan et al.

(10) Patent No.: US 7,255,950 B2
(45) Date of Patent: Aug. 14, 2007

(54) FUEL DELIVERY SYSTEM AND METHOD OF USE THEREOF

(75) Inventors: Alfred I-Tsung Pan, Sunnyvale, CA (US); Howard Taub, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 613 days.

(21) Appl. No.: 10/314,157

(22) Filed: Dec. 9, 2002

(65) Prior Publication Data

US 2004/0110046 A1   Jun. 10, 2004

(51) Int. Cl.
*H01M 8/04* (2006.01)

(52) U.S. Cl. .......................... 429/22; 429/13; 429/24; 429/34

(58) Field of Classification Search ............. None
See application file for complete search history.

(56) References Cited

U.S. PATENT DOCUMENTS

| | | | |
|---|---|---|---|
| 5,666,929 A * | 9/1997 | Knowlton et al. | 123/546 |
| 5,723,228 A * | 3/1998 | Okamoto | 429/12 |
| 6,572,994 B1 * | 6/2003 | Shimotori et al. | 429/26 |
| 6,821,658 B2 * | 11/2004 | Acker et al. | 429/13 |

OTHER PUBLICATIONS

"Methanol", Wikipedia, the free encyclopedia, pp. 1-6.*
"Methanol Properties", Cetiner Engineering Corporation, pp. 1-5.*

* cited by examiner

*Primary Examiner*—Jonathan Crepeau
*Assistant Examiner*—R. Hodge

(57) ABSTRACT

A fuel delivery system for a liquid-type fuel cell and method of use are disclosed. The fuel delivery system includes a fuel tank and a fuel controller. The fuel tank stores a concentrated fuel, which is delivered to a chamber containing a diluted fuel. The fuel delivery is controlled by the fuel controller such that the fuel concentration of the diluted fuel is maintained in an optimal range.

1 Claim, 4 Drawing Sheets

FUEL DELIVERY SYSTEM AND METHOD OF USE THEREOF

TECHNICAL FIELD

The technical field generally relates to fuel cells and in particular to fuel delivery systems for liquid-type fuel cells.

BACKGROUND

Fuel cells are electrochemical devices which directly convert hydrogen, or hydrogen-rich fuels into electricity without combustion. This process is much more efficient than traditional thermal power plants, converting up to 80% of the chemical energy in the fuel into electricity (compared to a maximum of 40% for conventional power plants). Compared to traditional energy sources, fuel cells require low working temperatures, produce little pollution and noise during operation, and are capable of responding rapidly to changes in the power demand.

Based on the physical characteristics of the fuel supply, fuel cells may be roughly divided into two families: gas-type fuel cells and liquid-type fuel cells. Direct alcohol fuel cells (DAFC) are a relatively new member of the liquid-type fuel cell family. In a DAFC, an alcohol fuel such as methanol, is oxidized at an anode catalyst layer to produce protons and carbon dioxide ($CO_2$). The protons migrate through an electrolyte from the anode to the cathode. At a cathode catalyst layer, oxygen reacts with the protons to form water. The anode and cathode reactions in this type of direct methanol fuel cell are shown in the following equations:

Anode reaction (fuel side): $CH_3OH + H_2O \rightarrow 6H^+ + CO_2 + 6e^-$     1.

Cathode reaction (air side): $3/2\ O_2 + 6H^+ + 6e^- \rightarrow 3H_2O$     2.

Net: $CH_3OH + 3/2\ O_2 \rightarrow 2H_2O + CO_2$     3.

The electrolyte can be an acidic or an alkaline solution, or a solid polymer ion-exchange membrane (PEM) characterized by a high ionic conductivity. Ideally, all the electro-oxidation should occur at the anode catalyst layer. However, since DAFCs use basically the same catalyst for both anode and cathode, a water soluble alcohol fuel may permeate through the electrolyte and combine with oxygen on the surface of the cathode catalyst. This phenomenon is termed "fuel crossover". Fuel crossover lowers the operating potential of the oxygen electrode and results in consumption of fuel without producing useful electrical energy. In general, fuel crossover is a parasitic reaction which lowers efficiency, reduces performance and generates heat in the fuel cell. It is therefore desirable to minimize the rate of fuel crossover.

There are a number of approaches to reduce fuel crossover. The rate of crossover is proportional to the permeability of the fuel through the solid electrolyte membrane and increases with increasing fuel concentration and temperature. The permeability of the PEM to the liquid fuel can be reduced by choosing a PEM with low water content, or by coating the PEM with a material that is permeable to hydrogen but not permeable to the fuel. In addition, the concentration of the liquid fuel can be lowered to reduce the crossover rate.

In direct methanol fuel cells (DMFC), fuel crossover is typically controlled by using diluted methanol fuel that contains 3-5 wt % methanol and 97-95 wt % water. The diluted fuel, however, reduces not only the fuel crossover but also the fuel efficiency of the fuel cell. Since one water molecule (molecular weight=18) is consumed with each methanol molecule (molecular weight=34) in the electrochemical reaction, only about 2.5 wt % water will be consumed with methanol in a fuel composition containing only 5 wt % methanol, the other 92.5 wt % of water becomes "dead weight". Therefore, the real "consumable fuel" in the diluted methanol fuel accounts to less than 8% of the total fuel composition.

SUMMARY

A fuel delivery system for a liquid-type fuel cell and methods of use are disclosed. The fuel delivery system comprises a fuel tank and a fuel controller. The fuel tank stores a concentrated fuel, which is delivered to a fuel cell containing a diluted fuel. The fuel delivery is controlled by the fuel controller such that the fuel concentration of the diluted fuel is maintained in a predetermined range to minimize fuel crossover.

In one embodiment, a method for actively monitoring the fuel concentration in a fuel cell and delivering a concentrated fuel to a reservoir of diluted fuel using the fuel delivery system is disclosed.

In another embodiment, a method for passively delivering a sufficient amount of a concentrated fuel to a reservoir of diluted fuel using the fuel delivery system is disclosed.

In yet another embodiment, a fuel cell comprising the fuel delivery system is disclosed.

BRIEF DESCRIPTION OF THE DRAWINGS

The embodiments of the fuel delivery system will be described in detail with reference to the following figures, in which like numerals refer to like elements, and in which.

DETAILED DESCRIPTION

Figure 1A:
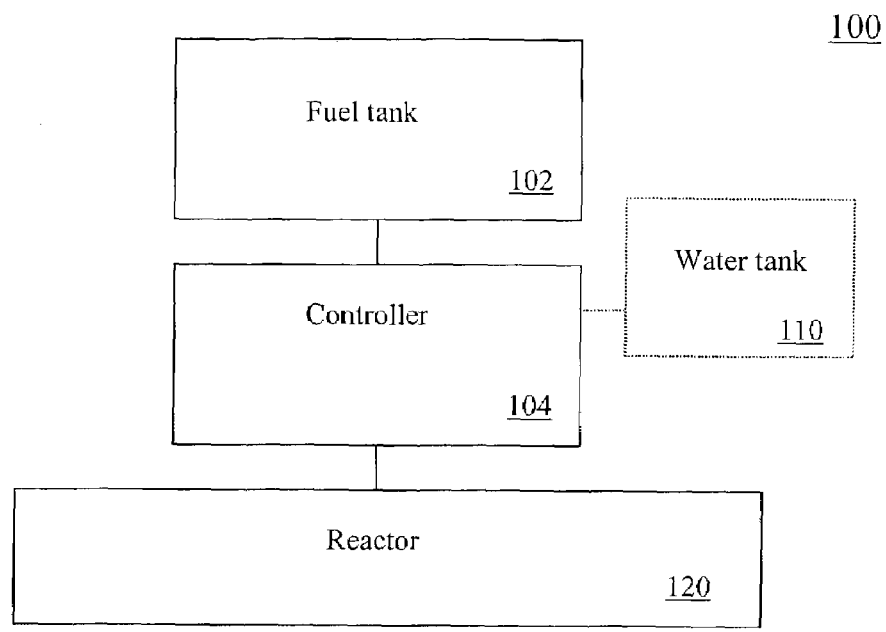
FIGS. 1A and 1B are block diagrams of a fuel delivery system.

As illustrated in FIG. 1A, an embodiment of the fuel delivery system 100 generally comprises a fuel tank 102 that stores a concentrated fuel, a fuel controller 104, and a reactor 120 where fuel cell electrodes are in contact with a diluted fuel. The fuel controller 104 monitors fuel consumption in the reactor 120 and delivers the concentrated fuel to the reactor 120 when fuel concentration in the reactor 120 falls below a predetermined level. By storing the fuel in a concentrated form and limiting the amount of the diluted fuel in the reactor 120, the fuel delivery system 100 significantly reduces the "dead weight" carried by the fuel cell and improves power density and device compactness. In some embodiments, however, the fuel delivery system 100 may include a water tank 110 that replenishes the reactor 120 for water consumed in the electrode reaction.

Fuel concentration in the reactor 120 may be determined in a number of ways. One approach is to measure fuel concentration directly with a fuel sensor. For example, in a DMFC, the methanol concentration in the fuel may be monitored by a methanol concentration sensor immersed in the diluted fuel. Alternatively, the fuel concentration may be determined indirectly by measuring other parameters that are related to fuel consumption. For example, the electricity generated by a fuel cell during a certain period is proportional to the fuel consumed in the same period. Therefore, the fuel concentration in the fuel cell can be calculated based on the power output of the fuel cell. Briefly, the fuel consumption ($\Delta F$) between time zero ($T_0$) and time x ($T_x$) can be defined as a function of the power output $\Delta P$ (wattage) in the following formula:

$$\Delta F = \Delta P \delta \qquad 4.$$

where $\delta$ (weight unit fuel consumed/per watt power output) is the fuel consumption constant of the fuel cell.

The fuel concentration at time x ($C_x$) can then be calculated as:

$$C_x = C_0 - \Delta F/V \qquad 5.$$

where $C_o$ is the fuel concentration at time zero, $\Delta F$ is the total fuel consumption (in weight units) between $T_0$ and $T_x$, and V is the fuel volume in the fuel cell (assuming the fuel volume change between $T_0$ and $T_x$ is negligible).

The fuel concentration $C_x$ can also be determined by measuring the production of any other byproduct, such as heat or $CO_2$, of the fuel cell operation between $T_0$ and $T_x$, so long as the generation of the byproduct is proportional to fuel consumption during this period.

The fuel delivery system 100 can be either an active or a passive delivery system. An active delivery system may make continuous measurements of fuel concentration and deliver fuel in any amount and at any time to maintain the optimal operation conditions of the fuel cell. An active delivery system can also be programmed to deliver fuel according to the specific requirement of a particular application. A passive fuel delivery system is usually less complex than an active fuel delivery system, requires little or no operating power, and is easy to operate and maintain.

Figure 1B:
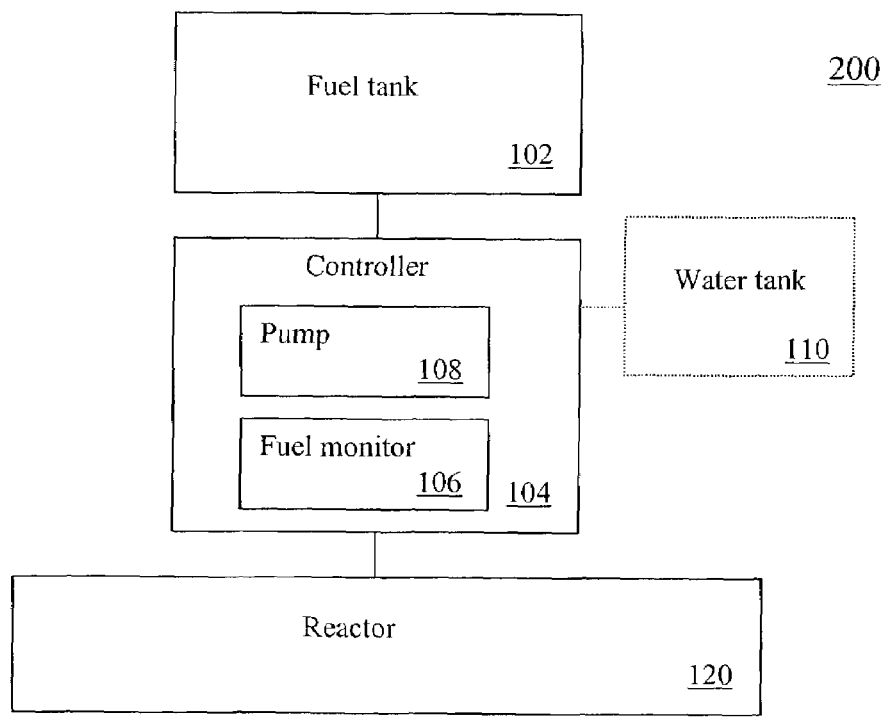

FIG. 1B is a block diagram of an active fuel delivery system 200, wherein the fuel controller 104 comprises a fuel monitor 106 and a pump 108. The fuel monitor 106 actively measures fuel concentration in the reactor 120 and provides feedback to the fuel controller 104. When fuel concentration in the reactor 120 falls below a predetermined level, the fuel controller 104 will activate the pump 108 to deliver the concentrated fuel from the tank 102 to the reactor 120 so that the fuel concentration in the reactor 120 is maintained within the optimal range. In the case of a direct methanol fuel cell, the optimal range of fuel concentration in the reactor 120 is 1-10% by weight, and preferably 3-5% by weight. The concentrated fuel can be pure methanol. The fuel delivery system 200 may also include a water tank 110 that replenishes the reactor 120 for water consumed in the electrode reaction.

Since the power output of a fuel cell is proportional to the reaction rate which, in turn, is proportional to the concentration of the reactant (i.e., the fuel concentration), the power output of the fuel cell may be controlled by adjusting the fuel concentration in the reactor 120. Therefore, the fuel controller 104 may also serve as a programmable power output controller for the fuel cell. In another words, the fuel controller 104 may increase or decrease the power output of the fuel cell by increasing or decreasing the fuel concentration in the reactor 120. To conserve energy, components of the active fuel delivery system, such as sensors and pumps, may be electrostatically operated on demand.

Figure 2:
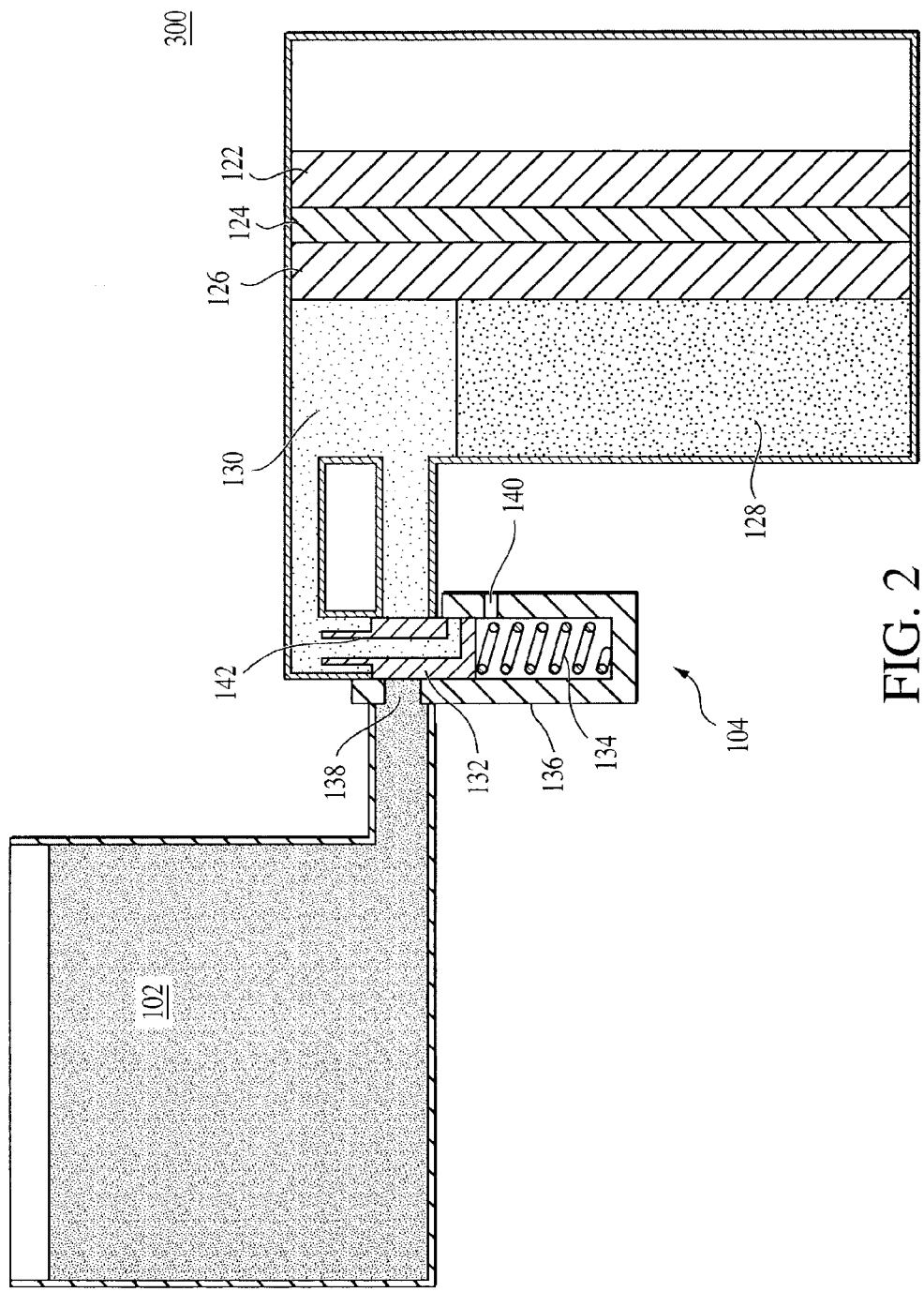
FIG. 2 depicts an embodiment of a fuel delivery system with fuel control valve in a closed state.
Figure 3:
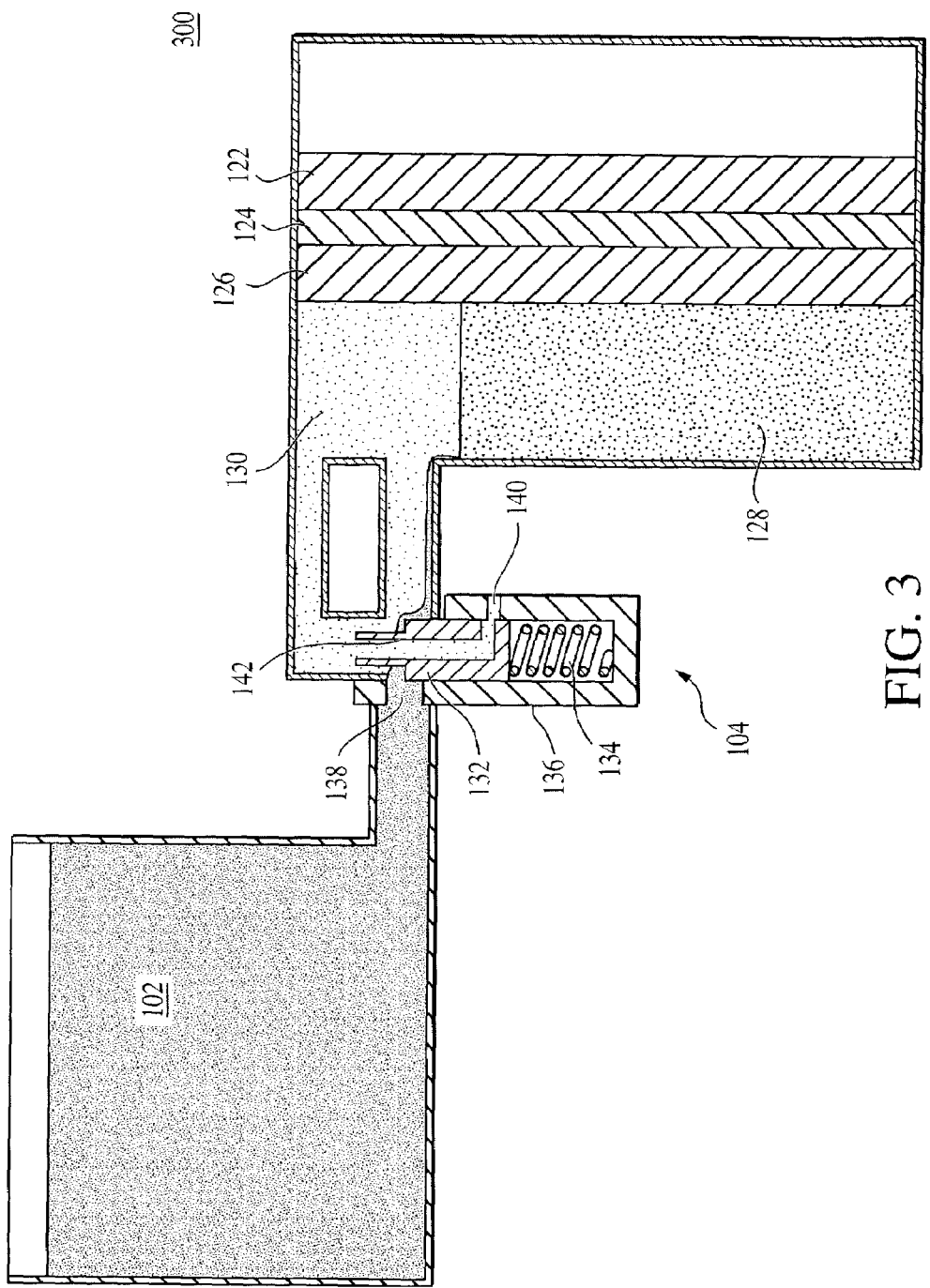
FIG. 3 depicts an embodiment of a fuel delivery system with fuel control valve in an open state.

FIGS. 2 and 3 depict a conceptual embodiment of a passive fuel delivery system 300. In this embodiment, the reactor 120 comprises a cathode 122, an electrolyte 124, an anode 126, and diluted methanol fuel 128, which is stored in an anode chamber 130. The fuel controller 104 is a pressure-operated valve comprising a plunger 132, a spring 134, and a valve body 136 having a fuel conduit 138 and an air vent 140. In an embodiment, the plunger 132 comprises at least two portions: a lower portion that fits into the inner cavity of the valve body 136 and an upper portion that has a smaller cross-section area than the lower portion. The plunger 132 also contains an air venting passageway 142 that has at least one opening in each portion of the plunger 132.

As illustrated in FIG. 2, when the fuel controller 104 is in a closed state, the anode chamber 130 is sealed by the plunger 132. The fuel conduit 138 and air vent 140 are both blocked by the lower portion of the plunger 132. The $CO_2$ produced by the anode reaction (Formula 1) accumulates inside the anode chamber 130 and, over time, gradually pushes the plunger 132 into the valve body 136 until the plunger 132 reaches an open position. The magnitude of the plunger movement is determined by the $CO_2$ pressure inside the anode chamber 130 and the resistance of the spring 134.

FIG. 3 illustrates the fuel controller 104 in an open state. In this state, the plunger 132 is pushed low enough so that the lower opening of the air venting passageway 142 reaches the air vent 140. Meanwhile, the fuel conduit 138 is now partially open, which allows the concentrated fuel to flow into the anode chamber 130 from the fuel tank 102. As the $CO_2$ inside the anode chamber 130 is released from the air vent 140, the pressure inside the anode chamber 130 decreases. The plunger 132 is then gradually pushed back by the spring 134 and eventually blocks the fuel conduit 138 and air vent 140 to complete the fuel delivery cycle.

In one embodiment, the size and location of the air vent 140 and fuel conduit 138, as well as the spring constant of the spring 134, are chosen in such a way that the amount of fuel admitted into the anode chamber 130 in each fuel delivery cycle is equal to the amount of fuel consumed during the cycle. The passive fuel controller 104 is also configured to allow fuel delivery when fuel concentration in the anode chamber 130 falls below a predetermined level (the set level). The set level is generally determined based on the operational requirements of the fuel cell. For example, the power output is significantly impaired in a DMFC if the fuel concentration falls below 1% by weight. Therefore, in one embodiment, the set level for a DMFC is at, or is slightly higher than, 1% by weight. Referring now to the embodiment shown in FIG. 2, the pressure inside the anode chamber 130 is proportional to the amount of $CO_2$ produced by the anode reaction which, in turn, is proportional to the methanol consumption on the anode side. The pressure inside the anode chamber 130 can be calculated based on the volume of the anode chamber 130 and the amount of fuel consumption. A threshold pressure that corresponds to the chamber pressure at the set fuel level can be determined. The passive fuel controller 104 can then be configured (by adjusting the size and position of openings for the fuel conduit 138 and air vent 140, as well as the spring constant of the spring 134) in such a way that the plunger 132 will be pushed to the open position once the pressure inside the anode chamber 130 reaches the threshold value.

During fuel cell operation, one water molecule (molecular weight=18) is consumed with each methanol molecule (molecular weight=34) at the anode side of the reactor 120, i.e., about one weight unit of water is consumed with every two weight units of methanol. Over the time, there will be less and less water in the anode chamber 130 to dilute the concentrated methanol delivered from the fuel tank 102. This problem may be solved by recycling water accumulated on the cathode side of the reactor 120 back to the anode chamber 130. Alternatively, additional water can be provided from a separate water tank (not shown) using a water controller (not shown) having the same design as the fuel controller 104. Alternatively, the water tank simply can be connected to the fuel controller 104 through an additional water conduit (not shown). The desired methanol/water delivery ratio (2:1 by weight) can be achieved by controlling the size of the water conduit relative to the size of the fuel conduit 138 when the plunger 132 is at the open position.

Figure 4:
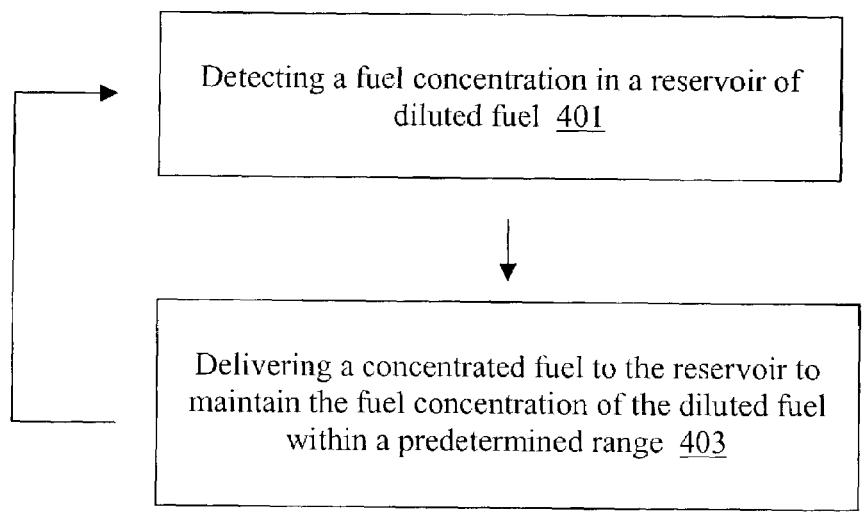
FIG. 4 is a flow diagram of a fuel delivery method.

FIG. 4 summarizes a method 400 for delivering fuel using the fuel delivery system of the present invention. The method 400 comprises the following steps.

(1) Monitoring (401) the fuel concentration of a reservoir of diluted fuel that is oxidized at the anode of a fuel cell to generate power. As described earlier, the fuel concentration of the diluted fuel may be determined directly by a fuel sensor, or indirectly by measuring fuel consumption, the power output, or the generation of a byproduct such as heat or a gas (e.g., $CO_2$).

(2) Delivering (403) a concentrated fuel to the reservoir of diluted fuel when fuel concentration in the reservoir falls below a predetermined level so that the fuel concentration of the diluted fuel is maintained within an optimal range. The optimal range of the fuel concentration is determined based on the type of the fuel cell and the intended usage of the fuel cell. For example, the optimal fuel concentration for a direct methanol fuel cell may range from 3%-5% by weight in order to minimize fuel crossover. However, if the fuel cell is to be used in an application that requires high power output, the optimal range of fuel concentration may become 5%-10% by weight. As demonstrated in various embodiments, the fuel delivery may be accomplished by either an active delivery system such as a pump, or a passive delivery system such as a pressure-operated valve.

After the fuel delivery, a new cycle starts again at step 1.

We claim:

1. A fuel delivery system for a liquid-type fuel cell using diluted fuel, said system comprising:

a fuel tank containing a concentrated fuel; and a fuel controller connecting said fuel tank to a reservoir of diluted fuel, which is in contact with an anode and is contained in a chamber, wherein said fuel controller delivers the concentrated fuel to the reservoir of diluted fuel when the fuel concentration of the diluted fuel falls below a predetermined level, and wherein the fuel controller comprises a pressure-operated valve comprising:

a tubular or valve body having a fuel conduit and an air vent;

a spring inside the valve body; and a plunger that is supported by the spring, wherein a position of the plunger relative to the valve body is passively determined by a balance between the spring and the pressure inside the chamber, wherein the fuel conduit and air vent are blocked by the plunger until the pressure inside the chamber reaches a predetermined value, and wherein the spring has a spring constant that allows the plunger to unblock the fuel conduit and the air vent when the pressure inside the chamber reaches the predetermined value.

* * * * *

UNITED STATES PATENT AND TRADEMARK OFFICE
CERTIFICATE OF CORRECTION

PATENT NO. : 7,255,950 B2
APPLICATION NO. : 10/314157
DATED : August 14, 2007
INVENTOR(S) : Alfred I-Tsung Pan et al.

It is certified that error appears in the above-identified patent and that said Letters Patent is hereby corrected as shown below:

In column 6, line 17, in Claim 1, after "tubular" delete "or".

Signed and Sealed this

Seventh Day of April, 2009

JOHN DOLL
*Acting Director of the United States Patent and Trademark Office*